3,485,655
ROOM TEMPERATURE STORABLE PRECATA-
LYZED SUBSTRATE FOR LAMINATES
Berton A. Cole, Renton, and Quentin F. Ruonavaara, Kent, Wash., assignors to The Boeing Company, Seattle, Wash., a corporation of Delaware
No Drawing. Filed Sept. 29, 1966, Ser. No. 584,047
Int. Cl. B44d 1/092; B32b 31/12
U.S. Cl. 117—54
10 Claims

ABSTRACT OF THE DISCLOSURE

A precatalyzed substrate is disclosed for use in the manufacture of laminates of the type wherein a polymerizable liquid thermosetting resin is coated over the substrate and is thereafter induced or permitted to set by the action of a catalyst in contact therewith, the resin being of the type whose polymerization reaction is peroxide catalyzed. The substrate is manufactured by coating it with a composition consisting of a peroxide catalyst system consisting essentially of a cyclic monoketone peroxide or diacyl peroxide room temperature polymerization initiator for polymerizable thermosetting resins, that is dissolved in cyclohexanone, and drying the coating on the substrate, substantially entirely in an adsorbed condition on the surface thereof.

---

This invention relates to the so-called "wet layup" procedure of producing molded or laminated articles by applying a coating of a polymerizable liquid thermosetting resin over a base material and thereafter inducing or permitting the polymerization reaction to proceed to a cured state, so as to bond the two materials together. More particularly, it relates to the manufacture of such articles from peroxide cured thermosetting resins and to a peroxide catalyst system of our discovery which can be precoated onto the base or substrate well in advance of the resin, i.e. a month or more in advance of the resin, yet will retain its effectiveness as an initiator of the reaction even though stored at ordinary room temperatures in the interim. Examples of the resins in question include those which are characterized with polyunsaturation such as polystyrene, the polyesters, certain modified epoxys, and certain silicones.

The "wet layup" of laminates from substrates on which the catalyst has been preapplied or "precatalyzed" is not new—and yet until this time the practice has had no commercial significance. For example, in U.S. Patents 2,748,028 and 2,978,354, each patentee precatalyzed his substrate so as to avoid the problem of "pot life" when working with wet layup procedures. However, by doing so, each patentee in effect substituted one problem for another in that the catalyst coating had little stability or longevity on the substrate, and it was necessary to apply the resin shortly after the catalyst in order to obtain a predictable result. Therefore, whereas he no longer had to contend with the instability of a precombined resin-catalyst system, each patentee nevertheless had to contend with the instability of one of his components, and could not carry out the process whenever he chose, and however he chose, in a single step, and with only the uncatalyzed resin to be applied.

A principal object of the present invention is to devise just such a means and technique; that is, a wet layup procedure in which the molder or laminator is freed from all time and temperature considerations, from all problems of instability and longevity, and from all necessity for scheduling a plurality of operations, selecting and weighing precise amounts of ingredients, and avoiding delays, work stoppages, and equipment breakdowns. In short, the invention has the object of reducing the wet layup procedure to a simple single-step, two-component operation in which even persons totally unfamiliar with plastics technology can successfully fabricate laminates with no more than a suitable substrate, a can of resin, and whatever equipment he chooses to apply the resin, such as a resin brush.

Another object is to devise a means and technique whereby such an operator can purchase a substrate to which the catalyst has been preapplied, so that he is relieved of all but the task of applying the uncatalyzed resin to the substrate. A still further object is to devise a means and technique whereby the catalyst can be precoated on the substrate under conditions which make it commercially feasible to store, transport, sell, or otherwise market and/or use the precoated substrate as a separate product distinct from the resin itself. A related object is to devise such a product in which the catalyst coating retains its ability to initiate the resin reaction over commercially feasible periods, such as up to several months or a year or two after its application to the substrate. The coating should also provide for rapid curing of the resin within commercially feasible periods, and it should be cheap to formulate from readily available materials, and easy to apply to the substrate. It should also permit the precoated substrate to be stored and handled under commercially feasible conditions, i.e. at ordinary room temperatures, and without undue fire hazard. It should not affect the flexural strength or other physical properties of the final composite product, and above all, it should produce a predictable result in all cases. Other objects and advantages will be apparent from the description of the invention which follows.

These objects and advantages are realized in accord with the invention by our discovery that cyclohexanone has a uniquely durable preservative effect on the cyclic monoketone and diacyl peroxide room temperature polymerization initiators for peroxide-cured thermosetting resins. Moreover, we have found that this effect is sufficiently lasting, i.e. for at least a month or more, to enable the substrate to be precatalyzed at the time of its manufacture, so that for the purchaser of the substrate, there remains only the task of applying the liquid resin to the precoated substrate when he puts it to use. The coated substrate can be stored at ordinary room temperatures and, if desired, can be used at room temperature with a suitably promoted resin. There is no fire hazard in storing or handling the precoated substrate, and the final composite product has equal or better physical properties than those formed by the conventional wet layup process. In short, the precoated substrate has all of the features and advantages of room temperature storable "preforms," such as are known in the fiber glass-reinforced resin industry; yet the substrate does not suffer the concomitant disadvantage of requiring elevated temperatures and pressures in the curing cycle.

Preferably, the coated substrate should be covered to extend the preservative effect to the maximum.

By designating the catalysts as "room temperature cures" we mean that they are effective at room temperature when a suitably promoted resin is applied. However, some other temperature may be chosen for the cure process, such as one which is elevated above room temperature, and in such a case the catalysts are, of course, equally effective.

In manufacturing the treated substrate, the peroxide is dissolved in the ketone preservative, and the resulting system is then applied to and dried in situ on the surface of the substrate. Ordinarily, one should use enough of the catalyst to obtain the fastest possible gel time which is practicable under the circumstances. However, the amounts of peroxide and preservative which are used vary widely from one application to another. Generally speaking, the coating need only contain so much peroxide as is necessary to cure the resin which is to be applied; and theoretically, there is no upper limit on the amount of peroxide which can be used. However, it is well known that too great a peroxide content may impair the physical properties of some laminates In the fiber glass reinforced resin industry, for example, it is known that a peroxide content of above 6% by weight of the fiber glass may impair the physical properties of the laminate.

Likewise, the ketone preservative or solvent need only be present in a quantity sufficient to dissolve and apply the peroxide to the substrate. Normally, this is determined by ascertaining in advance what quantity of the solvent is needed to cover the surface of the substrate. If the substrate is highly porous at the surface, it may be necessary to include an organic soluble thickener or film former in the precoating system. Such thickeners and film formers are well known, and are not essential in all cases, of course, particularly in the case of highly non-absorbent substrate media such as glass, linoleum, and synthetic fibers of the nature of nylon.

The following examples illustrate the invention as applied to the polyester resins. Unitary, form-sustaining, non-absorbent fiber glass materials are used as the substrate.

EXAMPLE I

The following is illustrative of the manner in which we prepare the coated substrate.

A sample of style 181 fiber glass cloth was weighed, then immersed in cyclohexanone, removed and suspended to permit the excess drippings to escape. As soon as they had done so, it was weighed to determine the percent of solvent adsorbed on the fiber glass. Next, an equivalent amount of cyclohexanone solvent was intermixed with six percent cyclohexanone peroxide catalyst diluted 50% with dibuyl phthalate, based on the weight of the fiber glass. Thereafter, another piece of the cloth, of the same size, was immersed in these solutions and suspended at room temperature in the air to dry. After twenty-four hours, the sample was transferred to a Mylar bag and stored at room temperature. In dry condition, the treated cloth had the same appearance as the untreated cloth. It was not the least sticky or tacky.

EXAMPLE II

To evaluate the effectiveness of the catalyst over a prolonged shelf life, the treated cloth from Example I was repeatedly taken out of storage and subjected to impregnation with a resin. At intervals of a few days or a week, 40% by weight of Laminac 4110 polyester resin prepared by the American Cyanamide Company of Wallingford, Conn., was promoted with one-half percent by weight cobalt naphthanate and brushed in approximate aliquout amounts on each of four "precatalyzed" sections of the cloth. The cloth sections were covered with a plastic film and the air was removed from them by squeezing it out with a squeegee. Thereafter, the gel time was observed as indicated by the inability of the resin to flow under manual pressure.

The gel time and Barcol hardness values for the samples is indicated below:

| Days following catalyst impregnation: | Gel time at 120° F., minutes | Barcol hardness after 2 hours |
|---|---|---|
| 1 | 5–10 | |
| 4 | 5–10 | |
| 7 | 5–10 | 55 |
| 13 | 5–10 | 55 |
| 21 | 5–10 | 50 |
| 28 | 5–10 | 50 |
| 35 | 5–10 | 45 |
| 42 | 5–10 | 50 |
| 60 | 5–10 | 55 |
| 75 | 5–10 | 55 |
| 80 | 5–10 | 55 |
| 90 | 5–10 | 50 |
| 120 | 5–10 | 50 |
| 180 | 5–10 | 50 |

EXAMPLE III

Similar such room temperature shelf life experiments were also conducted on other fiber glass material types which had been stored in Mylar bags. One such bag contained fiber glass mat which had been sprayed with 4% cyclohexanone peroxide catalyst (50% assay) in cyclohexanone solvent. Periodic examination of the mat showed that the resin gel period remained constant at approximately ten minutes throughout 12 months evaluation. The catalyst-preservative solution had no apparent deleterious effect on the binder system of the mat.

In another system, woven fiber glass roving which had been treated with 4% cyclohexanone peroxide catalyst (50% assay) in cyclohexanone solvent, and enclosed in Mylar bags, demonstrated no catalytic decomposition after one year, based on periodic resin gel tests.

A third instance involved style 1500 fiber glass cloth which had been impregnated with 6% cyclohexanone peroxide catalyst (50% assay) in cyclohexanone solvent. The material was stored as a roll in the open and periodic resin gel tests were observed on laminates, the material of which had been taken from the center of the roll. In such condition, the catalyst retained its effectiveness up to 100 days.

EXAMPLE IV

6% benzoyl peroxide (Luperco ATC) was precatalyzed into fiber glass cloth samples with cyclohexanone as the dispersing medium in the manner of Example I. Periodic gel time and Barcol hardness values over a forty day uncovered storage period demonstrated values comparable to cyclohexanone peroxide (U.S. Peroxygen CXP–50) precatalyzed with cyclohexanone. In each case there was no change from a five to ten minute period.

The samples were impregnated with polyester resin promoted with dimethyl aniline, and were cured at room temperature. The Barcol hardness after two hours was 30–40.

EXAMPLE V

When fiber glass woven roving is dipped in a solution of benzoyl peroxide in cyclohexanone, it seems to become more fragile. Therefore, the solution was sprayed onto the woven roving. After five months testing to date, it continues to have a 5–10 gel time.

EXAMPLE VI

Other room temperature ketone and diacyl peroxide cure systems for the polyesters are known. For example, see the recently published paper of David Noller et al. presented at the annual meeting of The Society of The Plastics Industry, Inc., entitled "Peroxide Curing of Unsaturated Polyesters," and in particular Table I thereof.

EXAMPLE VII

In our work we also examined other organic solvents for preservative properties with the room temperature cyclic monoketone and diacyl peroxide cures for the polyesters. These additional solvents included the aliphatic monoketones and diketones, the alcohols, the esters, the aromatic hydrocarbons, and the organic acids and halides.

In each case, cyclohexanone peroxide (U.S. Peroxygen CXP-50) was dispersed into fiber glass cloth with the solvent, the same dispersion technique being followed as outlined in Example I. Each solvent was evaluated for its catalyst preservative qualities by brushing on Selectron 5016 polyester resin promoted with ½% cobalt naphthanate, and observing the gel time of each sample as it cured at a temperature of 120° F. The results are recorded below with respect to each solvent. Cyclohexanone is also included for comparison.

| Solvent | Storage life (uncovered) | Gel time, increase |
|---|---|---|
| Cyclohexanone | 1 day to 40 days | No change from 10 mins. |
| Cycloheptanone | 1 day to 13 days | 10 min. to 20 min. |
| Cyclopentanone | 1 day to 4 days | 10 min. to 60 min. |
| 2,3-pentanedione | 1 day to 9 days | 10 min. to 300 min. |
| 2,4-pentanedione | do | 10 min. to 60 min. |
| 2,5-hexanedione | 1 day to 4 days | Do. |
| Methyl ethyl ketone | 1 day to 3 days | 10 min. to 70 min. |
| 3-pentanone | do | 10 min. to 55 min. |
| Methyl isobutyl ketone | do | 10 min. to 60 min. |
| Pinacolone | do | 10 min. to 85 min. |
| n-Butanol | 1 day to 7 days | 10 min. to 150 min. |
| n-Amyl alcohol | do | 10 min. to 140 min. |
| Isopropanol | do | 10 min. to 150 min. |
| Cyclohexanol | do | 10 min. to 160 min. |
| Ethyl acetate | do | 10 min. to 45 min. |
| Isobutyl propionate | do | 10 min. to 60 min. |
| Cyclohexyl acetate | do | 10 min. to 180 min. |
| Ethyl acetoacetate | 1 day to 10 days | 10 min. to 45 min. |
| Benzene | 1 day to 7 days | 10 min. to 60 min. |
| Toluene | 1 day to 3 days | Do. |
| Xylene | do | 10 min. to 300 min. |
| Acetic acid | 1 day to 7 days | 10 min. to 75 min. |
| Ethylene dichloride | do | 10 min. to 45 min. |

EXAMPLE VIII

A similar comparison was made with benzoyl peroxide (Luperco ATC). However, none of the alcohols dissolved the catalyst, and cycloheptanone and 2,5 hexanedione were also omitted for reasons of expense. Each system was cured at room temperature.

| Solvent | Storage life (uncovered) | Gel time, increase |
|---|---|---|
| Cyclohexanone | 1 day to 40 days | No change from 5 mins. |
| Cyclopentanone | 1 day to 18 days | 5 min. to 45 min. |
| 2,3-pentanedione | do | 5 min. to 20 min. |
| 2,4-pentanedione | do | 5 min. to 45 min. |
| Methyl ethyl ketone | do | Do. |
| Methyl isobutyl ketone | do | Do. |
| Pinacolone | do | Do. |
| Benzene | do | 5 min. to 50 min. |
| Toluene | do | Do. |
| Xylene | do | Do. |
| Ethyl acetate | do | Do. |
| Isobutyl propionate | do | 5 min. to 80 min. |
| Cyclohexyl acetate | do | 5 min. to 60 min. |
| Ethyl acetoacetate | do | 5 min. to 80 min. |
| Ethylene dichloride | do | 5 min. to 50 min. |

EXAMPLE IX

We also examined other peroxidic catalysts, such as methyl ethyl ketone peroxide (Lupersol DDM). The following is illustrative in the case of methyl ethyl ketone peroxide. Fiber glass was the substrate.

| Solvent | Expiration period | Gel period, increase |
|---|---|---|
| Methyl ethyl ketone | 1 day to 4 days | 30 min. to no reaction. |
| Methyl isobutyl ketone | 2 days to 5 days | 60 min. to 240 min. |
| 3-pentanone | 1 day to 4 days | 30 min. to no reaction. |
| Pinacolone | 1 day to 5 days | 30 min. to 240 min. |
| Cyclohexanone | 1 day to 14 days | 20 min. to 120 min. |

EXAMPLE X

The flexural strengths of style 181 fiber glass laminates which were prepared 90 and 100 days following precatalyzation were 38,000 and 38,500 p.s.i., respectively. This compared to 39,900 p.s.i. for a fiber glass laminate which was prepared by the conventional wet layup method. After 120 days, the strength of another laminate was 40,000 p.s.i.

EXAMPLE XI

Current fire codes require refrigerated storage of peroxides. To demonstrate that the fire code is inapplicable to the precatalyzed product, a comparative flamability study was made between benzoyl peroxide impregnated fiber glass specimens, one of which contained cyclohexanone as the catalyst carrier, and the other dibutyl phthalate.

To one of two 18″ x 1″ fiber glass woven roving specimens was added 30% benzoyl peroxide paste (Luperco ATC) diluted with cyclohexanone; and to the other was added 30% benzoyl peroxide paste diluted with dibutyl phthalate. The dilution materials were added in an amount sufficient to saturate the fiberglass. After the two specimens had been dried for 18 hours, they were tested in accord with ASTM designation D568–61, "The Standard Method of Test for Flamability of Plastics."

The benzoyl peroxide-dibutyl phthalate impregnated specimen was completely engulfed in flame and burned vigorously when a Bunsen burner flame was applied to the base of a vertically suspended strip of the same.

The benzoyl peroxide cyclohexanone specimen burned for ten seconds in the vicinity of the flame's source and then was extinguished. Although the flame source was maintained for five additional seconds, the specimen failed to reignite. It was concluded that the specimen was "self-extinguishing," apparently by smothering.

EXAMPLE XII

To stay within established limits for the peroxide content of the laminate, it is often necessary in the case of highly absorbent substrates, such as wood fiber substrates, to use an organic soluble film former such as ethylcellulose, polyvinyl butyral, or soluble nylon. The film former (or alternatively, an organic soluble thickner) retards penetration into the substrate.

As the above examples demonstrate, the invention opens up a wealth of production innovations in the plastics laminates industry. Not only are small users such as home hobbyists benefited by it, but also major users such as the car, boat, and spacecraft industries. For example, long-term precatalyzed fiberglass filament on bobbins permits more economical production line fiberglass winding than ever before, inasmuch as the production line may be stopped at will without fear of premature hardening of the resin in the "pot." Likewise, spray applications may omit the costly metering devices and special nozzle equipment which were necessary for a "wet" spray operation in the past. The invention requires only a standard hand paint-spray type unit since the only component to be sprayed is the resin.

We claim as our invention:

1. A method of precatalyzing a substrate for the manufacture of laminates of the type wherein a polymerizable liquid thermosetting resin is coated over the substrate and is thereafter induced or permitted to set by the action of a catalyst in contact therewith, the resin being of the type whose polymerization reaction is peroxide catalyzed, comprising the steps of coating the substrate with a composition consisting of a peroxide catalyst system consisting essentially of a cyclic monoketone peroxide or diacyl peroxide room temperature polymerization initiator for polymerizable thermosetting resins, that is dissolved in cyclohexanone, and drying the coating on the substrate, substantially entirely in an adsorbed condition on the surface thereof.

2. The method according to claim 1 wherein the polymerization initiator is cyclohexanone peroxide or benzoyl peroxide.

3. The precatalyzed substrate produced by the method steps recited in claim 1.

4. The method according to claim 1 wherein the substrate is composed of fiber glass.

5. The method according to claim 4 wherein the coated fiber glass substrate is rolled and/or bagged to reduce its exposure to the atmosphere.

6. The method according to claim 4 wherein the polymerization initiator is present in an amount ranging from 6% by weight of the fiber glass, down to the minimal amount necessary to cure a polyester resin.

7. A process for coating surfaces with a polymerizable liquid thermosetting resin of the type whose polymerization reaction is peroxide catalyzed, comprising coating the surface with a composition consisting of a peroxide catalyst system consisting essentially of a cyclic monoketone peroxide or diacyl peroxide room temperature polymerization initiator for polymerizable thermosetting resins, that is dissolved in cyclohexanone, drying the coating on the surface, and thereafter applying a coating of the aforesaid polymerizable liquid thermosetting resin and allowing said latter coating to set by action of the peroxide initiator.

8. A method of precatalyzing a strand of fiber material for a fibrous substrate for the manufacture of laminates of the type wherein a polymerizable liquid thermosetting resin is coated over the substrate and is thereafter induced or permitted to set by the action of a catalyst in contact therewith, the resin being of the type whose polymerization reaction is peroxide catalyzed, comprising the steps of coating the strand with a composition consisting of a peroxide catalyst system consisting essentially of a cyclic monoketone peroxide or diacyl peroxide room temperature polymerization initiator for polymerizable thermosetting resins, that is dissolved in cyclohexanone, and drying the coating on the strand substantially entirely in an adsorbed condition on the surface thereof.

9. The method according to claim 8 wherein the fiber material is glass.

10. The precatalyzed strand of fiber material produced by the method steps recited in claim 8.

References Cited
UNITED STATES PATENTS
2,978,354   4/1961   Lesser _____ 117—47

WILLIAM D. MARTIN, Primary Examiner

D. COHEN, Assistant Examiner

U.S. Cl. X.R.

117—72, 76, 126